United States Patent [19]
Kiewit et al.

[11] Patent Number: 4,644,509
[45] Date of Patent: Feb. 17, 1987

[54] ULTRASONIC AUDIENCE MEASUREMENT SYSTEM AND METHOD

[75] Inventors: David A. Kiewit, Palm Harbor; Daozheng Lu, Dunedin, both of Fla.

[73] Assignee: A. C. Nielsen Company, Northbrook, Ill.

[21] Appl. No.: 821,824

[22] Filed: Jan. 23, 1986

[51] Int. Cl.[4] ............................................. G01S 15/88
[52] U.S. Cl. .................................... 367/87; 367/104; 358/84
[58] Field of Search ...................... 358/84; 367/87, 93, 367/96, 97, 98, 104; 343/5 MM, 5 PD

[56] References Cited
U.S. PATENT DOCUMENTS

4,382,291   5/1983   Nakauchi ............................ 367/87
4,578,700   3/1986   Roberts et al. ....................... 358/84

*Primary Examiner*—Richard A. Farley
*Attorney, Agent, or Firm*—Mason, Kolehmainen, Rathburn & Wyss

[57] ABSTRACT

Method and apparatus for identifying a number of people in a monitored area wherein a first reflected ultrasonic wave map of the monitored area is collected that includes background objects. A second reflected ultrasonic wave map of the monitored area is collected when people may be present in the monitored area. The first collected background defining map is subtracted from the second collected map to obtain a resulting map. The resulting map is processed to identify clusters having a minimum intensity. A cluster size of the thus identified clusters is utilized to identify clusters corresponding to people. The ultrasonic detecting method and apparatus is utilized with a wave signal receiver for identifying an audience composition of the receiver and determining the viewing habits of the public.

22 Claims, 10 Drawing Figures

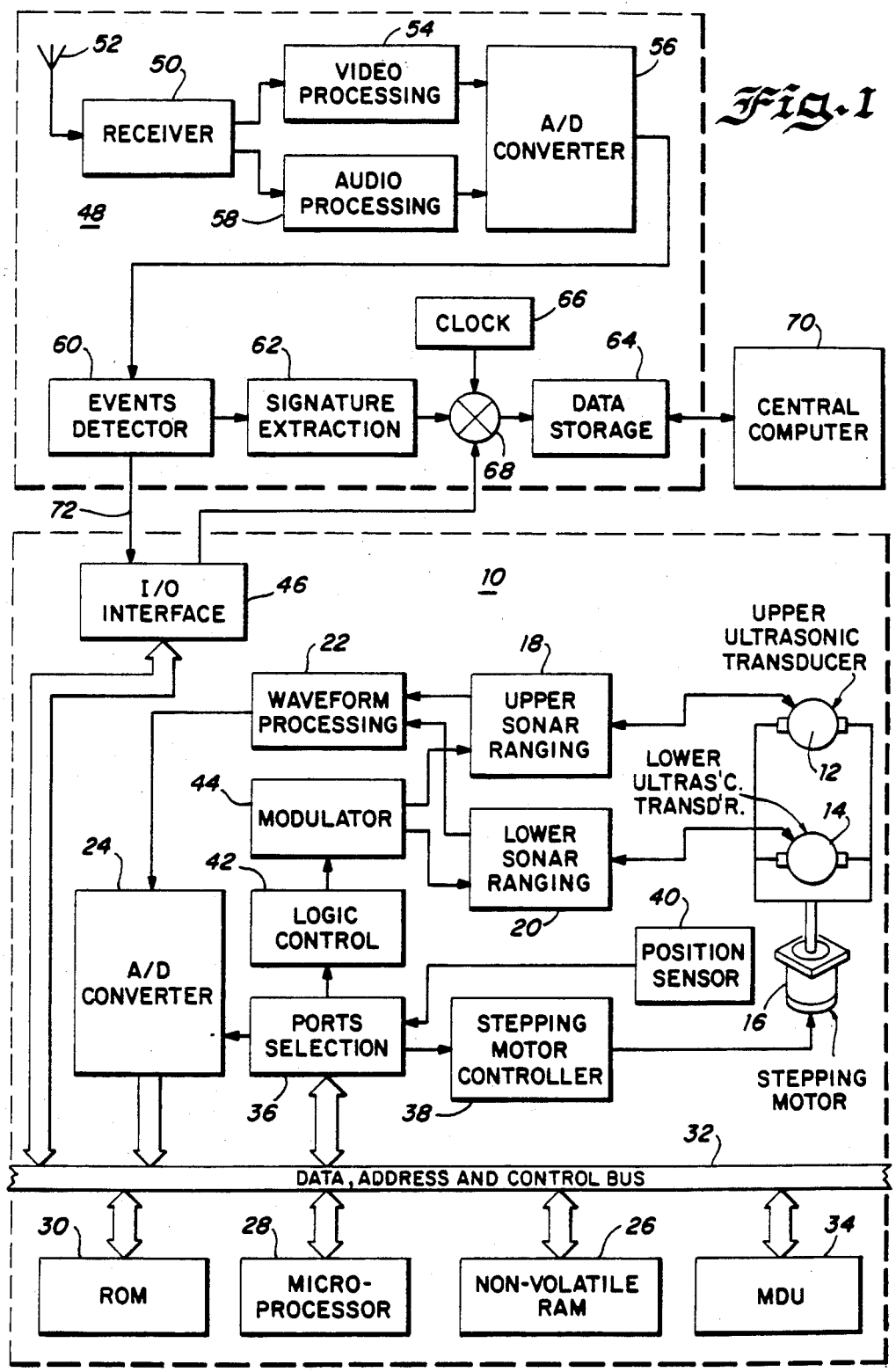

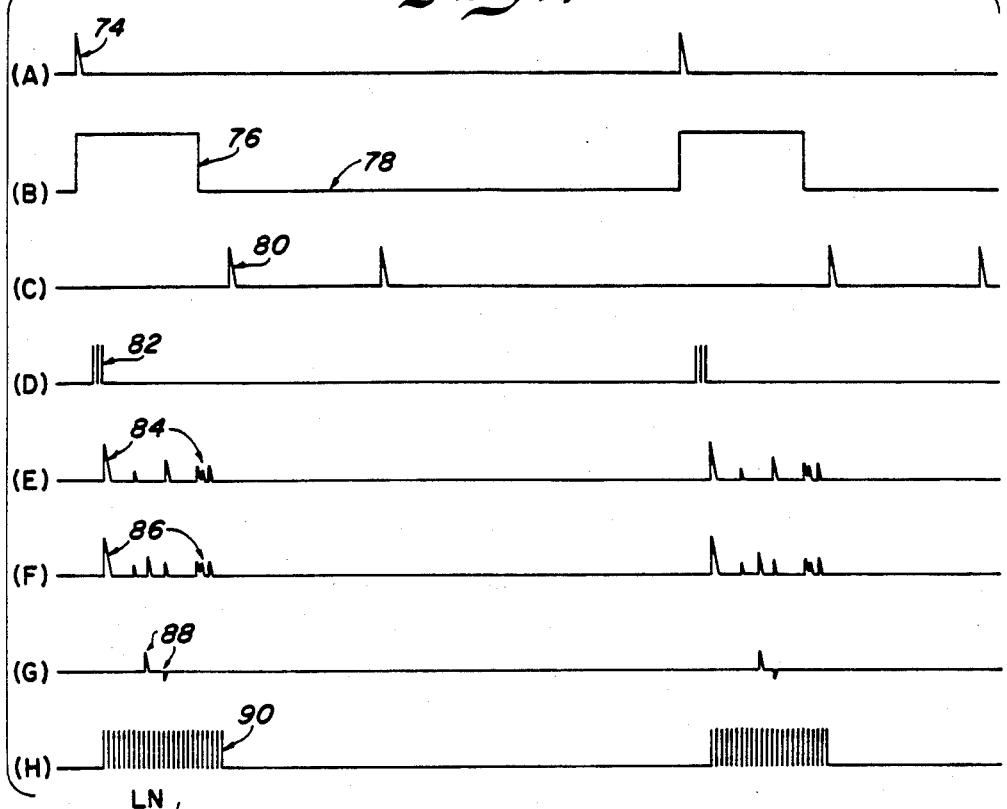
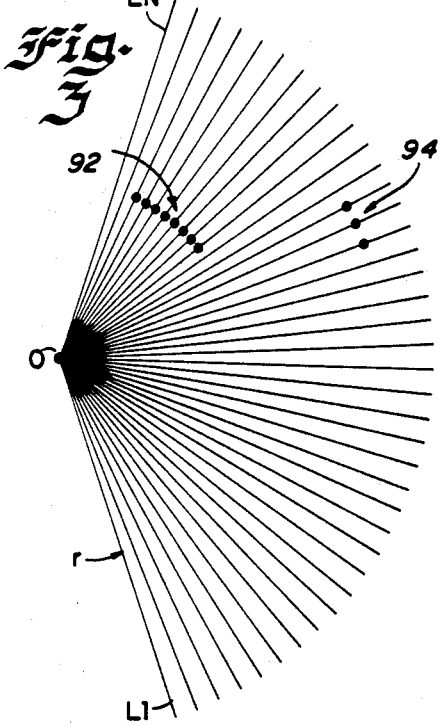
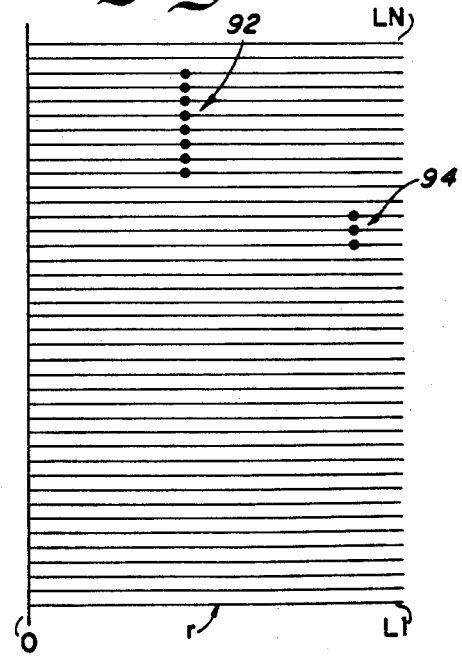

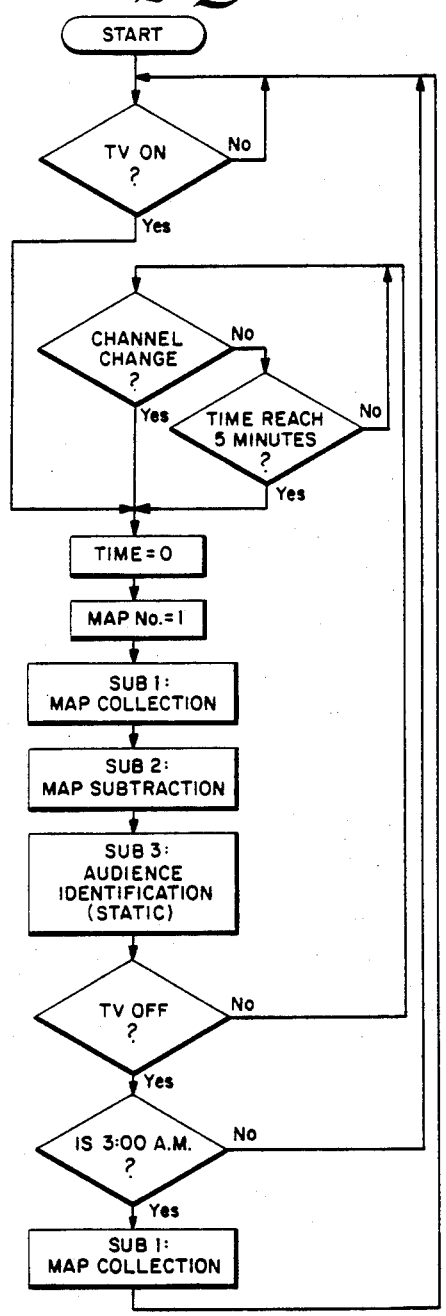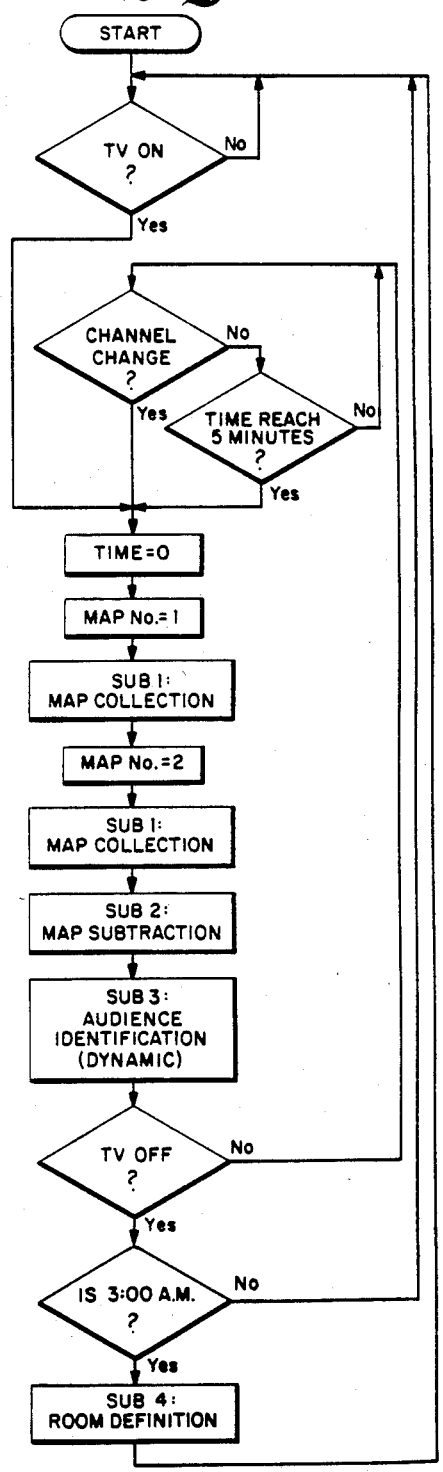

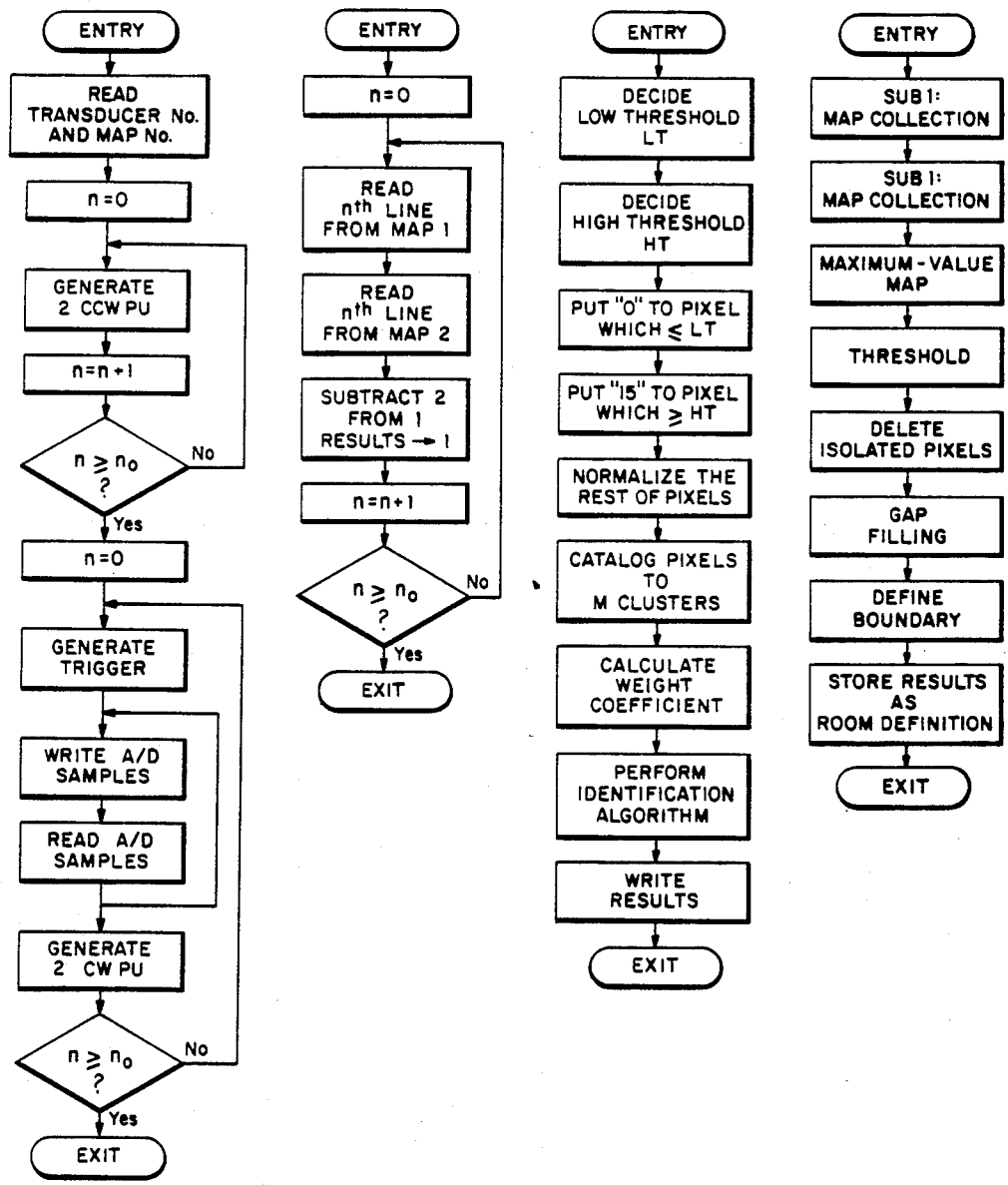

ULTRASONIC AUDIENCE MEASUREMENT SYSTEM AND METHOD

BACKGROUND OF THE INVENTION

1. Field of the Invention

This invention relates generally to methods and apparatus for determining the viewing/listening habits of the public, and more particularly to an improved ultrasonic, pulse-echo method and apparatus for determining the number of persons in the audience and the composition of the audience of a radio receiver and/or a television receiver.

2. Description of the Prior Art

Manual systems for determining the viewing/listening habits of the public are prone to inaccuracies resulting from the entry of erroneous data that may be intentionally or unintentionally entered and are slow in acquiring data.

U.S. Pat. No. 3,056,135 to Currey et al. issued Sept. 25, 1962 and assigned to the same assignee as the present application describes a method and apparatus for automatically determining the listening habits of wave signal receiver users. The method disclosed in Currey et al. provides a record of the number and types of persons using a wave signal receiver by monitoring the operational conditions of the receiver and utilizing both strategically placed switches for counting the number of persons entering, leaving and within a particular area and a photographic recorder for periodically recording the composition of the audience. A mailable magazine provides a record of both the audience composition and the receiver operation information for manual processing by a survey organization.

Various arrangements have been heretofore proposed for detecting motion utilizing an ultrasonic detection system. Such ultrasonic arrangements are shown, for example, in Iiea et al. U.S. Pat. No. 4,057,779, Kondo U.S. Pat. No. 4,213,196, and Salem U.S. Pat. No. 4,229,811. Other known ultrasonic systems are used for displaying images resulting from detected reflected waves.

SUMMARY OF THE INVENTION

It is an object of the present invention to provide an ultrasonic pulse-echo method and apparatus for identifying a number of people in a monitored area.

It is another object of the present invention to provide a method and apparatus for determining the viewing habits of the public that overcome many of the disadvantages of the prior art systems.

It is another object of the present invention to provide an improved ultrasonic pulse-echo method and apparatus for determining the viewing habits of the public.

It is another object of the present invention to provide an improved method and apparatus for determining the viewing/listening habits of the public that monitors a plurality of functional operations of a wave signal receiver and utilizes an ultrasonic pulse-echo scanning apparatus for identifying an audience composition of the receiver.

Briefly, in accordance with a preferred embodiment of the invention, there are provided a method and apparatus for identifying a number of people in a monitored area. A first reflected ultrasonic wave map of the monitored area is collected that includes background objects. A second reflected ultrasonic wave map of the monitored area is collected when people may be present in the monitored area. The first collected background defining map is subtracted from the second collected map to obtain a resulting map. The resulting map is processed to identify clusters having a minimum intensity. A cluster size of the thus identified clusters is utilized to identify clusters corresponding to people. The ultrasonic detecting method and apparatus is utilized with a wave signal receiver for identifying an audience composition of the receiver and determining the viewing habits of the public.

DESCRIPTION OF THE DRAWING

These and other objects and advantages of the present invention will become readily apparent upon consideration of the following detailed description and attached drawing, wherein:

FIG. 1 is a block diagram of an embodiment of an ultrasonic detecting system according to the present invention;

FIG. 2 is a timing diagram illustrating electrical waveforms occurring at various circuit locations of the apparatus of FIG. 1;

FIG. 3 provides a graphical representation of an area scanned by the apparatus of FIG. 1;

FIG. 4 provides a graphical representation of a stored map corresponding to the area shown in FIG. 3; and FIGS. 5A–5F are flow charts illustrating the logical steps performed by the apparatus of FIG. 1.

DETAILED DESCRIPTION OF THE PREFERRED EMBODIMENT

Referring now to the drawing, with particular attention to FIG. 1, there is illustrated a block diagram of an ultrasonic detecting system according to the invention designated by the reference character 10. Although useful for a variety of applications, the ultrasonic detecting system 10 advantageously may be used for determining an audience composition of a wave signal receiver and is described for this particular application herein.

The ultrasonic detecting system 10 includes an pair of ultrasonic transducers 12, 14, preferably piezoelectric transducers, for transmitting ultrasonic signals in an upper plane and a lower plane, for example, at a frequency above 50 KHz and for generating electrical signals in response to reflections of transmitted ultrasonic signals. The two tranducers 12 and 14 can be controlled separately, for example, the upper one may be used for defining a monitored area while the lower one is used for monitoring people; or, they perform the same function in order to increase the monitored area and the signal strength. A stepper motor 16 is operatively coupled to the transducers 12 and 14 for stepwise angular rotation of the transducers, each in the single plane.

Conventional ultrasonic ranging logic circuits 18 and 20 are coupled to the ultrasonic transducers 12 and 14, respectively, for producing an electronic signal burst that is applied to the transducers 12 and 14 for transmitting and for receiving and amplifying echo reflections from the transducers 12 and 14. A general purpose sonar range finder designer's kit which is manufactured and sold by Polaroid Corporation may be employed for each of the ultrasonic ranging logic circuitry 18 and 20, with the transducers 12, 14. Such a sonar range finder, designer's kit is described in U.S. Pat. No. 4,439,846 to Rodriguez issued Mar. 27, 1984. The disclosure of the above-mentioned patent is incorporated herein by reference.

The amplified echo signal from the ultrasonic ranging circuitry 18 and 20 is applied to a waveform processing circuit 22 that includes low-pass filters for providing a filtered echo signal that is applied to an analog-to-digital A/D converter 24 which generates a digital representation of the processed echo signal. The digitized signal is applied to a memory device, such as a nonvolatile random-access memory (NVRAM) 26 for further processing (discussed subsequently in greater detail).

A microprocessor system 28 and associated memory devices, such as a read-only memory (ROM) 30 that stores system and signal processing programs and the NVRAM 26 that stores system parameters and signal data, are used for signal processing within the ultrasonic detecting system 10. The microprocessor system 28 is programmable to perform the functions described below and includes, in known manner, a clock or external crystal oscillator and buffer logic circuitry for coupling data, address and controls inputs and outputs. An eight-bit microprocessor device, such as an RCA low power CMOS microprocessor type CDP1805A may be used for the microprocessor 28; however, various other commercially available microprocessors having standard capabilities can be used for the microprocessor 28. A microcomputer bus 32 for data, address and control signals enables communications between the microprocessor 28, the associated memory devices 26 and 30, the analog-to-digital converter 24, a multiply/divide logic unit (MDU) 34 and a port select logic circuit 36.

A stepping motor controller 38 is coupled to the microprocessor 28 via the port select logic circuit 36 and the microcomputer bus 32 for receiving motor control signals which are translated and applied to the stepper motor 16. A Superior Model M061-FD02 stepper motor which provides 1.8° per step may be used for the stepper motor 16. A stepper motor control translator such as a Superior Model ST101 which can provide 1000 steps per second can be employed for the stepper motor controller 38; however, various other commercially available stepper motor controller integrated circuits or circuit boards can be used for the stepper motor controller 38. A position sensor 40 detects the position of the transducers 12 and 14 and provides a feedback signal to the microprocessor 28 via the port select logic circuit 36 and the microcomputer bus 32 for accurately positioning the transducers 12 and 14 along a plurality of predefined lines.

A logic control circuit 42 is coupled to the port select logic circuit 36 for receiving signals from the microprocessor 28 that are applied to a modulator circuit 44. The modulator circuit 44 provides control signals to the ultrasonic ranging logic circuits 18 and 20.

The ultrasonic detecting system 10 further includes an input/output I/O interface circuit 46 that enables bidirectional data transfer between the ultrasonic detecting system 10 and a host system for a particular application. The illustrated host system generally designated by the reference number 48 is a home unit that receives signals to be identified from a wave signal receiver 50 that is coupled to a receiving antenna 52. Such a home unit is described in U.S. patent application Ser. No. 604,367 filed Apr. 26, 1984 to David A. Kiewit and Daozheng Lu.

Video signals representative of the program applied to the receiver 50 are applied to a video processing circuit 54. The video processing circuit 54 includes a detector and a low pass filter and provides a signal representative of the envelope of the video signal to an analog to digital A/D converter 56 which generates a digital representation of the video envelope.

Audio signals representative of the program applied to the receiver 50 are applied to an audio processing circuit 58. The audio processing circuit 58 includes an energy detector and a plurality of bandpass filters and provides a detected energy signal and signals representative of an audio spectrum within a predefined range. The audio spectrum signals are applied to the A/D converter 56 which generates digital representations of the audio spectrum signals.

The digitized video envelope signal and the digitized audio signals are applied to an events detector 60 which detects predetermined events that occur in the digitized audio and video signals, and causes the signature of the digitized signals to be extracted by signature extraction circuitry 62 upon the occurrence of a predetermined event or a sequence of predetermined events. The signature thus generated is stored in a data storage system 64 along with the time that the signature was extracted. The extraction times are provided by a clock 66 which provides a digital representation of time to the data storage system 64 via, for example, a combining circuit 68.

An output 72 of the events detector 60 is coupled via the I/O interface circuit 46 and the microcomputer bus 32 to the microprocessor 28. The output 72 enables the microprocessor 28 to perform various programs depending on the particular detected event. The audience number and composition output data from the ultrasonic detecting system 10 is applied to the combining circuit 68 for storage with the extracted signatures from the home unit 48.

The home unit 48 is interrogated at periodic intervals, for example, once a day, by a central computer system 70 which compares the signatures from the various home units with reference signatures in order to identify viewing and listening habits of users of the wave signal receiver 50.

Although a signature extracting home unit is illustrated as the home unit 48 in the illustrated embodiment, other home units could be used to identify the program being viewed. Such home units include units that sense the channel to which the receiver is tuned, either mechanically, by monitoring tuning voltage in voltage controlled tuners, or by measuring local oscillator frequency.

Referring to FIG. 2, operations of the respective components of the ultrasonic detecting system 10 are now described. A sonar trigger signal 74 (line A of FIG. 2) is applied to the logic control circuit 42 and has a period of, for example, 200 milliseconds. Line B of FIG. 2 shows an enable pulse 76 that is applied to the ultrasonic ranging logic circuits 18 and 20 via the control logic 42 and modulator 44 for transmitting an ultrasonic wave signal and detecting an echo reflection wave signal of the transmitted signal. The enabling pulse 76 may be, for example, 40 milliseconds wide. The enable pulse is followed by a disable period 78, for example, 160 milliseconds, for moving the transducers 12 and 14 via the operation of the stepper motor 16 to a next line for scanning and includes a delay period for damping. Line C of FIG. 2 shows a control signal 80 that is applied to the stepper motor 16 for providing two steps of angular rotation of the transducers 12 and 14, for example, 3.6°

. Line D of FIG. 2 illustrates a transmitted pulse 82 or train of periodic oscillation of a predetermined frequency, preferably above 50 KHz produced by the ultrasonic ranging circuits 18 and 20 and applied to the transducers 12 and 14 via the sonar ranging circuits 18 and 20. Line E of FIG. 2 provides an exemplary detected echo reflection signal 84 of the transmitted signal with background information only. Line F of FIG. 2 provides an exemplary detected echo reflection wave signal 86 of the transmitted signal with background and people present in the scanned line. Line G of FIG. 2 illustrates a wave signal 80 resulting from subtracting line E from line F of FIG. 2, as a graphical example of map subtraction to identify the people present within the scanned line. Line H of FIG. 2 illustrates a sampling pulse 90 or train of periodic oscillations of the A/D converter 28, having a sampling period of, for example, 0.5 msec. corresponding to a sampling rate of 2 KHz to provide 80 sample pulses during the sample period for each scanned line.

Referring to FIG. 3, there is shown a graphical representation of a predefined scanned area. A predetermined number of lines, L1 through LN, for example 40 lines, are scanned by the stepwise angular rotation of the transducers 12 and 14 in the upper and lower planes. The transducers 12 and 14 are located at the origin position O. The detection distance r of the lines L1–LN may be for example 22 feet. The transducers 12 and 14 may be rotated for example 3.6° per step to provide a total scanned area of 144° for the exemplary 40 scanned lines. Utilizing 80 samples per line (line H of FIG. 2) a total of 32,000 data picture elements or pixels corresponding to the reflected wave signal are stored for the 40 scanned lines to define a map and 4-bits may be used to describe each pixel resulting in 1.6K bits of data for each map of the predefined area.

Referring also to FIG. 4, there is shown a graphical representation of a stored map corresponding to the scanned area illustrated in FIG. 3. The stored map includes the scanning angle for each of the lines L1–LN stored vertically and the radial detected distance r stored horizontally. A pair of groups of dots 92 and 94 represent objects within the predefined scanned area.

Referring now to FIGS. 5A–5E, there are shown flow charts illustrating the logical steps performed formed by the ultrasonic detecting system 10 in conjunction with the home system 48.

Referring first to FIG. 5A, there is shown a flow chart illustrating a first, static method of the logical steps performed by the ultrasonic detecting system 10. The ultrasonic detecting system 10 operates when the receiver 50 is ON to determine the number of people in the audience and the composition of the audience of the receiver 50. An audience map is collected whenever an enable signal is received via the I/O interface 46 from the home unit 48 and also after a predetermined time period has elapsed since the previous audience map was collected. The home unit 48 may provide an enable signal to the ultrasonic detecting system 10 whenever an operational mode change occurs, for example, when the channel of the receiver 50 is changed.

Once enabled either by the predetermined elapsed time or by the enable signal from the home unit 48, the ultrasonic detecting system 10 functions to collect a map of the predefined monitored area. A stored background map is then subtracted from the collected map to eliminate background items, such as furniture. The resulting map is then used for audience identification.

The ultrasonic detecting system 10 continues these functions until the receiver 50 is turned off. The background map is collected and stored at periodic intervals, for example, once a day when the receiver 50 is off and at a defined time, such as 3:00 a.m. when people are not expected to be in the monitored area.

Referring now to FIG. 5B, an alternative, dynamic method is illustrated for the operation of the ultrasonic detecting system 10. The before described periodically collected background map is not used; instead a room definition subroutine is performed for defining maximum boundaries of the monitored area. In the dynamic method illustrated in FIG. 5B, a second map is collected after a predetermined time period, for example, 5 seconds following the collection of the first map. The second map is subtracted from the first collected map to eliminate stationary objects. The resulting map is then used for audience identification.

FIG. 5C illustrates a map collecting subroutine corresponding to the SUB 1: MAP COLLECTION block included in both FIGS. 5A and 5B. The map collection subroutine begins by reading both a transducer number that corresponds to the upper transducer 12 or the lower transducer 14 and a map number that corresponds to a background map or to the first or second map utilized in the method illustrated in FIG. 5B. The control signal that is applied to stepper motor 16 for producing two steps of angular rotation is generated and applied to the stepper motor 16. A reset signal is applied to the stepper motor 16 if it is determined that the present line position is greater than or equal to the LN position that is illustrated in FIG. 3. The map collection begins with the stepper motor moved to the L1 position illustrated in FIG. 3 with the generation of a trigger pulse (line A, FIG. 2). Next a write operation of the analog reflected signal (e.g., line E, FIG. 2) of the digital representation of the reflected signal followed by a read operation of the A/D converter 24 is performed and repeated, for example, 80 times utilizing 80 samples per line. A control signal is then applied to the stepper motor 16 (line C of FIG. 2) to move the stepper motor 16 and the transducer 12 and 14 to the next line position. The above-described sequential steps are repeated for each scanned line L1 through LN to provide a map of the defined monitored area.

Referring now to FIG. 5D, there is shown a flow chart of the map subtraction subroutine included in the blocks captioned SUB 2: MAP SUBTRACTION of FIGS. 5A and 5B. As is apparent from the flow chart of FIG. 5D, map subtraction is performed by sequentially subtracting corresponding lines L1 through LN to obtain a resulting subtracted map.

Referring now to FIG. 5E, there is shown a flow chart of the SUB 3: AUDIENCE IDENTIFICATION subroutine as included in the audience identification block shown in FIGS. 5A and 5B. The audience identification subroutine begins with processing the pixel data to establish a low threshold intensity value LT and a high threshold intensity value HT of the exemplary 4-bit data format of the pixel data. A fixed value may be utilized for the low threshold pixel value. Alternatively, the low threshold value LT may be used corresponding to either a minimum intensity value of the pixel data. Alternatively, the low threshold value LT may be selected by identifying a predetermined number of pixels, such as a fixed fraction of the total number of pixels, for example, ⅔ of the 3200 pixels or 2133 pixels, having the lowest intensity values and identifying a maximum intensity value of these pixels. The low threshold value LT may correspond to a value higher than the identified maximum intensity value of the predetermined number of pixels. The high threshold value HT may correspond to either a maximum intensity value of the pixel data or a fixed value.

The pixels having an intensity value less than the low threshold value LT are ignored or treated as zero. The values of the pixels above the high threshold value HT are assigned a fixed value corresponding to the high threshold value HT, for example, 14. The remaining pixels are normalized utilizing the particular low threshold value LT and high threshold value HT. Isolated pixels without neighboring pixels are deleted and treated as zero. The normalized pixels are reorganized utilizing an index number and the polar coordinates (as illustrated in FIG. 3) that are transformed to a horizontal coordinate and a vertical coordinate and are used together with the polar coordinates and an intensity value to define an element function array. The element function array is utilized to recognize clusters of the pixel elements. The identified clusters are used to identify the number of people in the monitored area.

A weight coefficient of the identified clusters is calculated corresponding to the reflection area or the object's physical size. An audience identification algorithm is performed using the calculated cluster weight coefficient. For a cluster weight coefficient less than a predefined minimum threshold value, the cluster will be considered as noise and will be ignored and the number of people identified in the predefined area will be reduced by the corresponding number of clusters having a weight coefficient less than the threshold value. Additionally, if the weight coefficient value is greater than a predetermined high threshold value, the pixel elements within the cluster are further utilized to define subclusters. The further processing of the pixel elements may include calculating the mean value of the elements, calculating the initial point and the extreme points of the pixel elements and utilizing the number of extreme points to estimate the number of people in the cluster.

Additionally, the calculated weight coefficients of each of the clusters are compared with prestored weight coefficients which correspond to particular family members to identify a particular family member when the calculated and stored weight coefficients match. The program parameters including, for example, the low threshold value LT, the high threshold value HT, the weight coefficient and the transducer numbers are different for the audience identification subroutine for the static method (FIG. 5A) as compared to the dynamic method (FIG. 5B).

Referring now to FIG. 5F, there is shown a flow chart of the SUB 4: ROOM DEFINITION as included in the room definition block shown in FIG. 5B. The subroutine collects two boundary maps utilizing the upper transducer 12. These boundary maps are combined to provide a maximum value map. Threshold values are compared with the pixel data to provide a binary map. Then isolated pixels without neighboring pixels are deleted and isolated zero pixels with neighboring pixels are treated as one to fill in gaps. A room definition including a boundary of the room is defined and stored utilizing predetermined criteria, for example, by utilizing possible maximum room size and minimum viewing distance.

Although the present invention has been described in connection with details of the preferred embodiment, many alterations and modifications may be made without departing from the invention. Accordingly, it is intended that all such alterations and modifications be considered as within the spirit and scope of the invention as defined in the appended claims

What is claimed and desired to be secured by Letters Patent is:

1. A method of identifying a number of people in a monitored area comprising the steps of:
   collecting a first reflected ultrasonic wave map of the monitored area;
   collecting a second reflected ultrasonic wave map of the monitored area;
   subtracting the first map from the second map to obtain a resulting map;
   processing the resulting map to identify clusters having a minimum intensity;
   calculating a weight coefficient of the identified clusters; and
   comparing the calculated weight coefficients with predefined values.

2. The method as recited in claim 1 wherein said step of collecting a reflected ultrasonic wave map comprises the steps of sequentially transmitting at least one ultrasonic wave signal along a plurality of predefined lines within the monitored area, detecting a reflected echo signal of the transmitted ultrasonic wave signal, low pass filtering the detected echo signal, periodically sampling the filtered echo signal to provide a series of echo samples and digitizing the echo samples to provide a series of pixel data for each scanned line.

3. A method as recited in claim 2 wherein said step of subtracting the first map from the second map includes the steps of sequentially subtracting corresponding pixel data for each scanned line.

4. A method as recited in claim 2 wherein said step of processing the resulting map to identify clusters having a minimum intensity comprising the steps of comparing an intensity value of said pixel data with a low threshold value to identify pixel data to be deleted, and processing the remaining pixel data to define element function arrays to identify clusters.

5. A method as recited in claim 4 wherein said step of calculating a weight coeffcient of the identified clusters comprises the steps of calculating a reflection area of the identified clusters.

6. A system for identifying a number of people in a monitored area comprising:
   means for collecting a first reflected ultrasonic wave map of the monitored area;
   means for collecting a second reflected ultrasonic wave map of the monitored area;
   means for subtracting the first map from the second map to obtain a resulting map;
   means for processing the resulting map to identify clusters having a minimum intensity;
   means for calculating a weight coefficient of the identified clusters; and
   means for comparing the calculated weight coefficients with predefined values.

7. A system as recited in claim 6 wherein said means for collecting a reflected ultrasonic wave map including means for sequentially transmitting at least one ultrasonic wave signal along a plurality of predefined lines within the monitored area, means for detecting a reflected echo signal of the transmitted ultrasonic wave signal, means for low pass filtering the detected echo signal, means for periodically sampling the filtered echo signal to provide a series of echo samples and means for digitizing the echo samples to provide a series of pixel data for each scanned line.

8. A system as recited in claim 7 wherein said means for subtracting the first map from the second map includes means for sequentially subtracting corresponding pixel data for each scanned line.

9. A system as recited in claim 7 wherein said means for processing the resulting map to identify clusters having a minimum intensity includes means for comparing an intensity value of said pixel data with a low threshold value to identify pixel data to be deleted, and means for processing the remaining pixel data to define element function arrays to identify clusters.

10. A system as recited in claim 9 wherein said means for calculating a weight coefficent of the identified clusters comprises means for calculating a reflection area of the identified clusters.

11. A method of determining the viewing/listening habits of the public by simultaneously identifying a signal being received by a receiver and the composition of the audience of the receiver comprising the steps of:
  detecting predetermined functional operational modes of the receiver;
  detecting a predetermined event;
  identifying a signal being received by the receiver responsive to said detected predetermined event;
  collecting a first reflected ultrasonic wave map of background objects in a monitored area of the receiver responsive to a predetermined operational mode of the receiver;
  collecting a second reflected ultrasonic wave map of the monitored area responsive to said identified received signal;
  subtracting the first map from the second map to obtain a resulting map;
  processing the resulting map to identify a number of clusters having both a minimum intensity and a minimum weight coefficient; and
  storing the identified received signal, the number of the identified clusters, and the time of the second ultrasonic map collection.

12. The method as recited in claim 11 wherein said step of collecting a reflected ultrasonic wave map comprises the steps of sequentially transmitting at least one ultrasonic wave signal along a plurality of predefined lines within the monitored area, detecting a reflected echo signal of the transmitted ultrasonic wave signal, low pass filtering the detected echo signal, periodically sampling the filtered echo signal to provide a series of echo samples and digitizing the echo samples to provide a series of pixel data for each scanned line.

13. A method as recited in claim 12 wherein said step of subtracting the first map from the second map includes the steps of sequentially subtracting corresponding pixel data for each scanned line.

14. A method as recited in claim 12 wherein said step of processing the resulting map to identify clusters having a minimum intensity comprising the steps of comparing an intensity value of said pixel data with a low threshold value to identify pixel data to be deleted, and processing the remaining pixel data to define element function arrays to identify clusters.

15. A method as recited in claim 14 further comprising the step of calculating a weight coeffcent of the identified clusters including the step of calculating a reflection area of the identified clusters.

16. A method as recited in claim 15 further comprising the step of comparing said calculated weight coefficient with a stored value to identify a particular viewer/listener.

17. A system for determining the viewing/listening habits of the public by simultaneously identifying a signal being received by a receiver and the composition of the audience of the receiver comprising:
  means for detecting predetermined functional operational modes of the receiver;
  means for detecting a predetermined event;
  means for identifying the signal being received by the receiver responsive to said detected predetermined event;
  means for collecting a first reflected ultrasonic wave map of background objects in a monitored area of the receiver responsive to a predetermined operational mode of the receiver;
  means for collecting a second reflected ultrasonic wave map of the monitored area responsive to said identified received signal;
  means for subtracting the first map from the second map to obtain a resulting map;
  means for processing the resulting map to identify a number of clusters having both a minimum intensity and a minimum weight coefficient; and
  means for storing the identified received signal, the number of the identified clusters, and the time of the second map collection.

18. A system as recited in claim 17 wherein said means for collecting a reflected ultrasonic wave map comprises means for sequentially transmitting at least one ultrasonic wave signal along a plurality of predefined lines within the monitored area, means for detecting a reflected echo signal of the transmitted ultrasonic wave signal, means for low pass filtering the detected echo signal, means for periodically sampling the filtered echo signal to provide a series of echo samples and means for digitizing the echo samples to provide a series of pixel data for each scanned line.

19. A system as recited in claim 18 wherein said means for subtracting the first map from the second map includes means for sequentially subtracting corresponding pixel data for each scanned line.

20. A system as recited in claim 18, wherein said means for processing the resulting map to identify clusters having a minimum intensity comprises means for comparing an intensity value of said pixel data with a low threshold value to identify pixel data to be deleted, and means for processing the remaining pixel data to define element function arrays to identify clusters.

21. A system as recited in claim 20 further comprising means for calculating a weight coeffcent of the identified clusters including means for calculating a reflection area of the identified clusters.

22. A system as recited in claim 21, further comprising means for comparing said calculated weight coefficients with a stored value to identify a particular viewer.

* * * * *